June 6, 1950 T. J. BRABHAM 2,510,545
TIP PROOF BOTTLEHOLDER
Filed Dec. 23, 1948 2 Sheets-Sheet 1
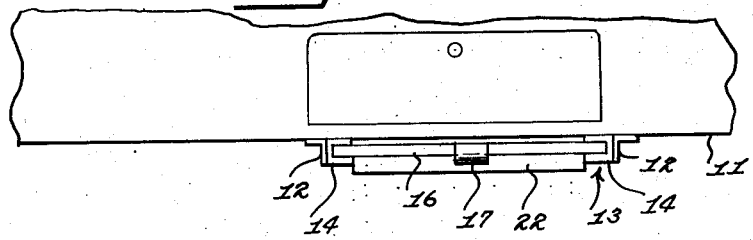
INVENTOR.
Thomas J. Brabham
BY
McMorrow, Berman + Davidson
ATTORNEYS

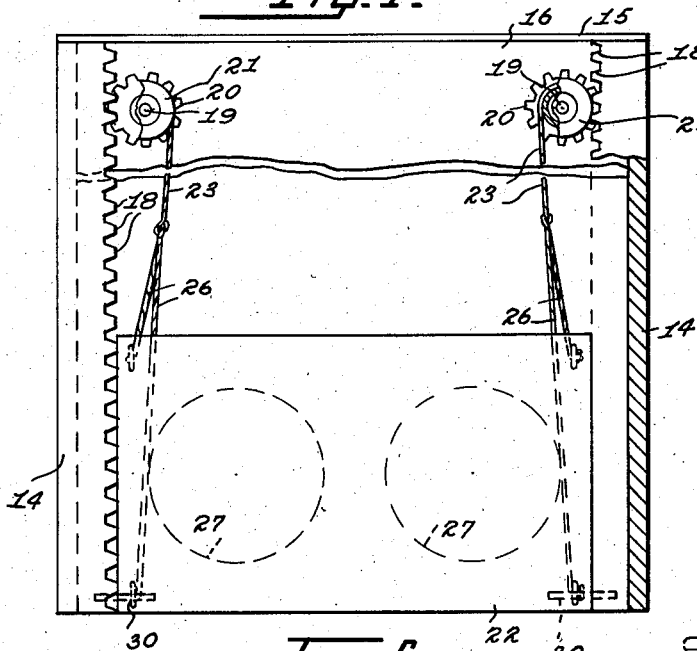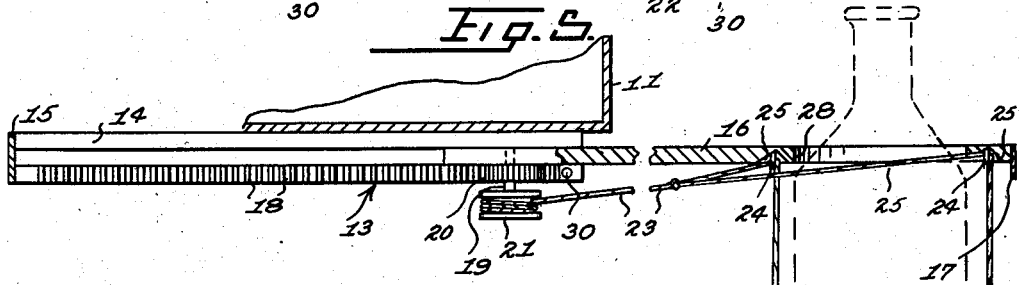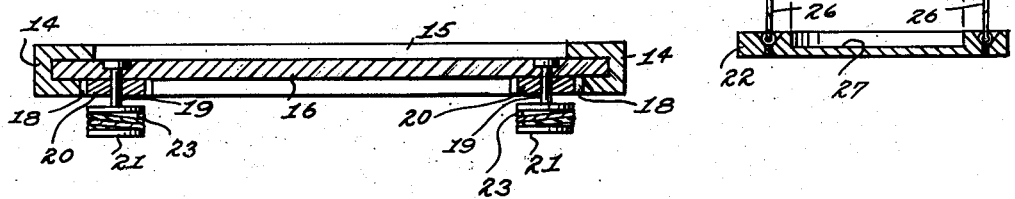

Patented June 6, 1950

2,510,545

UNITED STATES PATENT OFFICE 2,510,545

TIPPROOF BOTTLEHOLDER

Thomas J. Brabham, Greensboro, N. C.

Application December 23, 1948, Serial No. 66,935

3 Claims. (Cl. 211—74)

This invention relates to bottle-supporting devices, and more particularly to a bottle support device adapted for use in vehicles, which may be readily moved to a collapsed, housed position when its use is not required.

A main object of the invention is to provide a novel and improved tip-proof bottle supporting device for use in vehicles, said device being very simple in construction, compact in size, and automatically foldable to a collapsed flat condition when it is moved from its usable position to a housed position.

A further object of the invention is to provide an improved tip-preventing bottle supporting device for vehicles, said device being very easy to install, simple to manipulate, inexpensive to manufacture, and being suitable for mounting beneath the dashboard of a conventional motor vehicle.

Further objects and advantages of the invention will become apparent from the following description and claims, and from the accompanying drawings, wherein:

Figure 1 is a front elevational view of a portion of a motor vehicle dashboard provided with a bottle supporting device according to the present invention, the device being shown in its housed inoperative position.

Figure 2 is an enlarged top plan view of the bottle-supporting device of Figure 1.

Figure 3 is a side elevational view of the bottle-supporting device of Figures 1 and 2.

Figure 4 is a cross-sectional view taken on line 4—4 of Figure 3.

Figure 5 is an enlarged cross-sectional detail view taken on line 5—5 of Figure 2, but showing the device in a forwardly extended position ready for use.

Figure 6 is a cross-sectional view taken on line 6—6 of Figure 2.

Referring to the drawings, 11 designates the dashboard of a conventional motor vehicle. Designated at 12, 12 are spaced parallel angle brackets secured to the bottom flange of the dashboard at any suitable location, as for example, adjacent the glove compartment.

Secured between the depending flanges of the angle brackets 12 is the bottle supporting device, designated generally at 13. Said device comprises a pair of inwardly facing side channel bars 14, 14 secured respectively to the angle brackets 12, 12, and connected at their rear ends by a vertical transverse bar 15. Slidably positioned in the channel bars 14, 14 is a flat rectangular plate member 16 formed with a handle 17 at the intermediate portion of its front margin.

The lower flanges of the channel bars 14, 14 are formed at their edges with rack teeth 18. Journalled to the inner corner portions of the plate member 16 inwardly adjacent the rack teeth 18 are the respective depending vertical shafts 19, 19, and secured on these shafts are the respective gears 20, 20, meshing with said rack teeth, as shown in Figure 4. Each shaft 19 has secured to its lower end a grooved reel 21.

Designated at 22 is a rectangular tray member which underlies the forward portion of plate member 16 and which is receivable between the toothed lower flanges of the channel bars 14, 14, as shown in Figure 1. Designated at 23, 23 are respective flexible cables. One end of each cable is secured to a reel 21. Secured to the respective corner portions of the tray member 22 are the respective flexible cables 26. The pair of cables 26 at each end of the tray member 22 pass through respective eyes 24 secured in recesses 25 formed in the underside of plate member 16, above each corner portion of the tray member. The ends of each pair of cables 26 are then secured to a respective cable 23. Tray member 22 is formed with a plurality of circular recesses 27 and the plate member 16 is formed with circular openings 28 vertically aligned with the respective circular recesses 27. As shown in Figure 5, when the tray member 22 is in a lowered position, bottles, such as are shown in dotted view at 29 may be supported in the recesses 27, the bottles passing through the openings 28 so as to be supported against tipping.

Normally when the device is not in use, plate member 16 is housed completely between the channel bars 14, 14 with the rear edge of said plate member abutting the bar member 15, as shown in Figures 2 and 4. In this position the cables 23, 23 are wound up on the reels 21 and the tray member is in a raised position substantially in abutment with the bottom surface of the plate member 16. To arrange the device for use, plate member 16 is drawn forwardly by means of handle 17 to an extended position, as shown in Figure 5, whereby the gears 20 are rotated by the rack teeth, causing the reels 21 to unwind the cables and allowing the tray member 22 to descend. The lower flanges of the channel members 14, 14 carry inwardly projecting pins 30 at their forward end portions which are engaged by the gears 20 and act as stop means preventing withdrawal of the plate member 16 beyond the position shown in Figure 5. The botties may then be inserted through the openings 28 into positions in the recesses 27 of the tray member 22. When the device is no longer required, the plate member 16 is merely pushed rearwardly into abutment with bar member 15. The cables 23 are thereby wound up on the reels 21, elevating the tray member 22 to the position shown in Figure 1.

While a specific embodiment of a tip-preventing bottle-supporting device for vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A bottle-supporting device of the character described comprising a pair of parallel inwardly facing side channel bars, a rectangular plate member slidably supported in said channel bars, said plate member being formed with an opening, a tray member, a pair of reels rotatably secured to the bottom of said plate member, guide means carried by the underside of said plate member, respective flexible cables fastened to said reels and threaded through the guide means, means securing the cables to the side portions of the tray member, and means for rotating said reels responsive to lengthwise movement of the plate member with respect to the channel bars.

2. A bottle-supporting device of the character described comprising a pair of parallel guide members, a rectangular plate member slidably supported in said guide members, said plate member being formed with a bottle-receiving opening, said guide members being formed with rack teeth extending longitudinally thereof, a tray member beneath said opening, a pair of reels rotatably secured to the bottom of the plate member, gear teeth respectively carried by the reels and meshing with the respective rack teeth of the guide members, guide means carried by the underside of said plate member, respective flexible cables secured to said reels and threaded through the guide means, and means securing the cables to the respective side portions of the tray member.

3. A bottle-supporting device of the character described comprising a pair of parallel inwardly facing side channel bars, the lower flanges of said bars being formed with rack teeth, a rectangular plate member slidably supported in said channel bars, said plate member being formed with an opening, a tray member positioned below said opening, a pair of reels rotatably secured to the underside of said plate member, gears respectively carried by the reels and meshing with the respective toothed lower flanges of the channel bars, apertured guide means carried by the underside of the plate member, respective flexible cables secured to said reels and threaded through the apertured guide means, and means securing the ends of the cables to the respective side portions of the tray member.

THOMAS J. BRABHAM.

REFERENCES CITED

The following references are of record in the file of this patent:

UNITED STATES PATENTS

| Number | Name | Date |
| --- | --- | --- |
| 1,062,263 | Sundquist | May 20, 1913 |
| 2,082,672 | Waugh | June 1, 1937 |
| 2,486,564 | Kamin | Nov. 1, 1949 |